United States Patent
Botti et al.

(10) Patent No.: US 6,316,907 B1
(45) Date of Patent: Nov. 13, 2001

(54) FILTERING AND VOLTAGE RAISING CIRCUIT FOR CONNECTION BETWEEN A CAR RADIO AND A MOTOR-VEHICLE BATTERY

(75) Inventors: Edoardo Botti, Pavia; Luigi Crespi; Fabrizio Cassani, both of Milan, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/594,526

(22) Filed: Jun. 14, 2000

(30) Foreign Application Priority Data

Jun. 16, 1999 (EP) .................................... 99830373

(51) Int. Cl.$^7$ .................................................. H01M 10/46
(52) U.S. Cl. ............................................ 320/104; 320/165
(58) Field of Search .................................... 320/165, 103, 320/104

(56) References Cited

U.S. PATENT DOCUMENTS

| | | | |
|---|---|---|---|
| 4,720,668 | * 1/1988 | Lee et al. | 323/771 |
| 5,110,534 | * 5/1992 | Yamaguchi | 363/63 X |
| 5,514,935 | 5/1996 | Oda et al. | 315/82 |
| 5,668,466 | * 9/1997 | Vinciarelli et al. | 363/16 X |
| 5,724,237 | * 3/1998 | Hunter | 363/65 |

FOREIGN PATENT DOCUMENTS

| | | |
|---|---|---|
| 41 24 616 A1 | 1/1993 | (DE) . |
| 44 00 093 A1 | 7/1994 | (DE) . |
| 195 01 985 A1 | 2/1998 | (DE) . |

* cited by examiner

Primary Examiner—Edward H. Tso
(74) Attorney, Agent, or Firm—Theodore E. Galanthay; E. Russell Tarleton; Seed IP Law Group, PLLC

(57) ABSTRACT

A circuit having an anti-interference filter constituted by an inductor in series with one of the supply terminals of the car radio and by a capacitor in parallel with the supply terminals, and a diode connected in series with the inductor for protection against reversal of the polarity of the battery. The connection circuit may include an electronic switch between the node of the connection of the inductor to the diode and the other supply terminal, and a circuit for controlling the switching of the electronic switch. A voltage raiser that utilizes the components of the filter for its operation is thus produced.

15 Claims, 4 Drawing Sheets

FILTERING AND VOLTAGE RAISING CIRCUIT FOR CONNECTION BETWEEN A CAR RADIO AND A MOTOR-VEHICLE BATTERY

TECHNICAL FIELD

The present invention relates to a circuit for connection between the supply terminals of a car radio and a motor-vehicle battery, that provides a filtering and protection function and selectively a voltage raising function.

BACKGROUND OF THE INVENTION

As used herein, the term battery is intended to define the source of direct-current electrical energy of a motor vehicle, comprising recharging and stabilizing circuits in addition to the actual battery. The term car radio relates not only to a radio receiver but also to any electronic apparatus, supplied by the battery, for reproducing sound or for other uses.

As is known when the engine of the motor-vehicle is started, and also during normal operation of the motor vehicle, the direct voltage generated by the battery is subject to interference, such as reductions in level and pulsed positive and negative transients, which may cause malfunctioning or even breakdown of electronic devices connected to the battery. In the case of a car radio, a reduction in level below a minimum permitted voltage may cause the apparatus to switch off, and pulsed transients may cause annoying noises to be emitted by the loud speakers.

It is also known that incorrect connection of the battery (reversal of polarity) can cause serious damage to the apparatus supplied by the battery.

To limit interference, a filter is usually used in the circuit connecting the car radio to the battery. To prevent damage due to accidental reversal of the battery polarity, suitable protection means are used in the connection circuit. A typical connection circuit comprising a filter and a Protection device is shown in FIG. 1. The circuit, indicated by the reference number 10 in the drawing, is interposed between a battery 11 and a car radio 12 and is normally located physically in the container that houses the car radio. The circuit is constituted by an LC filter and by a power diode. The LC filter in this example is a two-pole, low-pass filter and is formed by an inductor L in series, that is, connected between the positive pole of the battery 11 and a supply terminal of the car radio 12, and by a capacitor C in parallel with the car radio supply terminals. The diode, indicated Dp, is also connected in parallel with the car radio supply terminals, more precisely, for reverse conduction, that is, with its anode connected to the terminal of the circuit that is to be connected to the negative pole of the battery, so that the diode conducts only when the battery is connected with reversed polarity. A fuse 13, which intervenes and interrupts the supply in the event of overloading, is normally provided between the positive pole of the battery 12 and the connection circuit 10.

It is known that, in order to increase the output power of the car radio or of other apparatus supplied by the motor-vehicle battery, it is possible to use a voltage raising circuit as described, for example, in Italian patent application No. MI99A000257 filed by the Applicant herein on Feb. 10th 1999. When necessary, this circuit is connected between the filtering and protection circuit 10 and the supply terminals of the apparatus.

The known filtering and protection circuit 10 of FIG. 1 has some disadvantages, as a result of which it is not always reliable and effective in use. In particular, if the battery is connected with reversed polarity, the voltage drop in the diode is quite high, for example 2 V, so that, between the supply terminals of the car radio, there will be a negative voltage (−2 V), which may damage the apparatus before the fuse intervenes and interrupts the connection to the battery. Moreover, a negative transient in the battery voltage Vbatt is translated, at the output of the filter, into a voltage Vfil with oscillations of considerable amplitude that are also potentially damaging to the apparatus. For example, as is shown in the graph of FIG. 3, relating to an apparatus that absorbs a current of 2A, a transient of the battery voltage Vbatt which starts at 14 V, falls to 0 V and rises again to 18 V before returning to 14 V brings about a ripple of the filter output voltage Vfil, which goes from −0.7 V to 26 V.

SUMMARY OF THE INVENTION

In accordance with the disclosed embodiments of the present invention, a circuit for connection between a car radio and a motor-vehicle battery that contains a filtering and protection circuit that is reliable and effective in all applications is provided.

In accordance with another aspect of the invention, a circuit for connection between a car radio and a motor-vehicle battery that performs filtering and protection functions together with a voltage-raising function is provided.

The circuit includes, in one embodiment, an inductor coupled in series with a supply terminal of an electronic accessory, a capacitor in parallel with the supply terminals of the accessory, and a diode connected in series with the inductor and configured to protect the accessory against reversal of polarity from an electrical energy source, such as a battery.

In accordance with another aspect of the invention, an accessory circuit for motor vehicles is provided, including a source of direct current electrical energy; an electronic accessory; and a circuit coupled to the electrical energy source and the electronic accessory for filtering electrical energy supplied to the electronic accessory and for protecting the electronic accessory from current reversal.

In accordance with another aspect of the foregoing embodiment, the circuit includes an anti-interference filter constituted by an inductor in series with one of the supply terminals of the electronic accessory, a capacitor connected in parallel with the supply terminals of the electronic accessory, and a diode connected in series with an inductor and configured for protection against reversal of the polarity of the battery.

In accordance with yet another aspect of the foregoing embodiment, the circuit may also include an electronic switch coupled between the node of the connection of the inductor to the diode and the other supply terminal on the electronic accessory. Ideally, a circuit for controlling the switching of the electronic switch is provided such that a voltage raising function is provided utilizing the capacitive and inductive components of the anti-interference filter.

BRIEF DESCRIPTION OF THE DRAWINGS

The disclosed embodiments of the invention will be understood further from the following detailed description of two preferred embodiments thereof, given with reference to the appended drawings, in which.

DETAILED DESCRIPTION OF THE INVENTION

Figure 1:
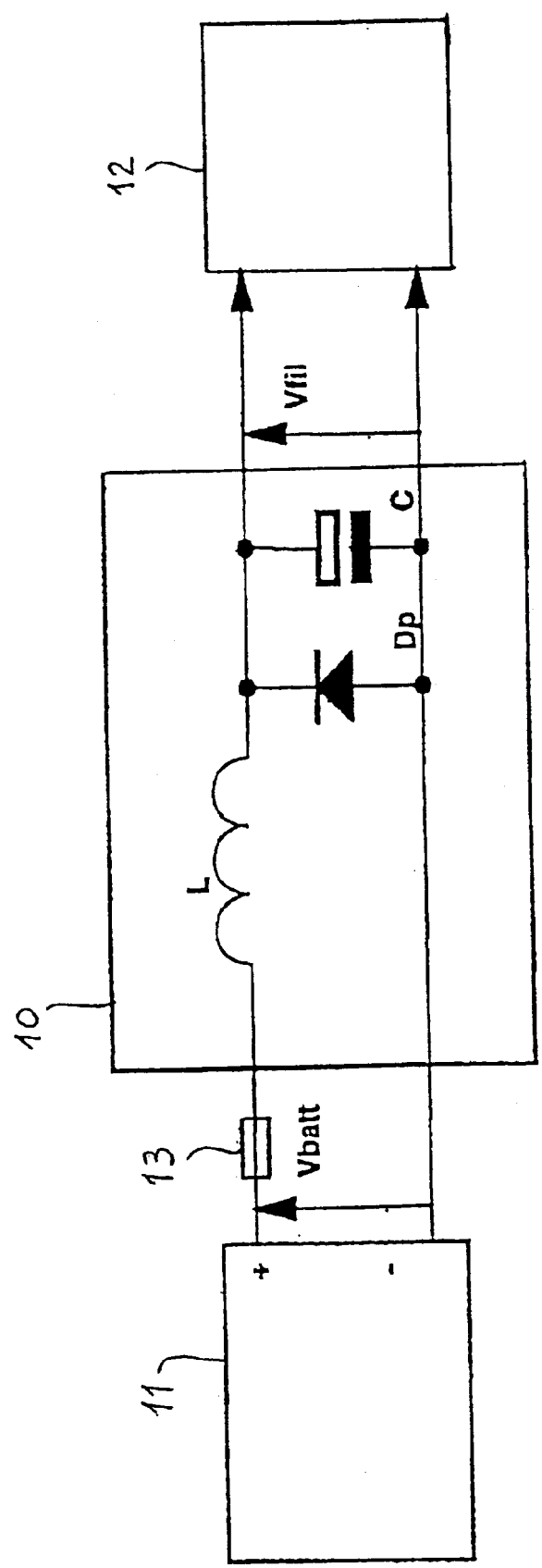
FIG. 1 shows a known filtering and protection circuit.
Figure 2:
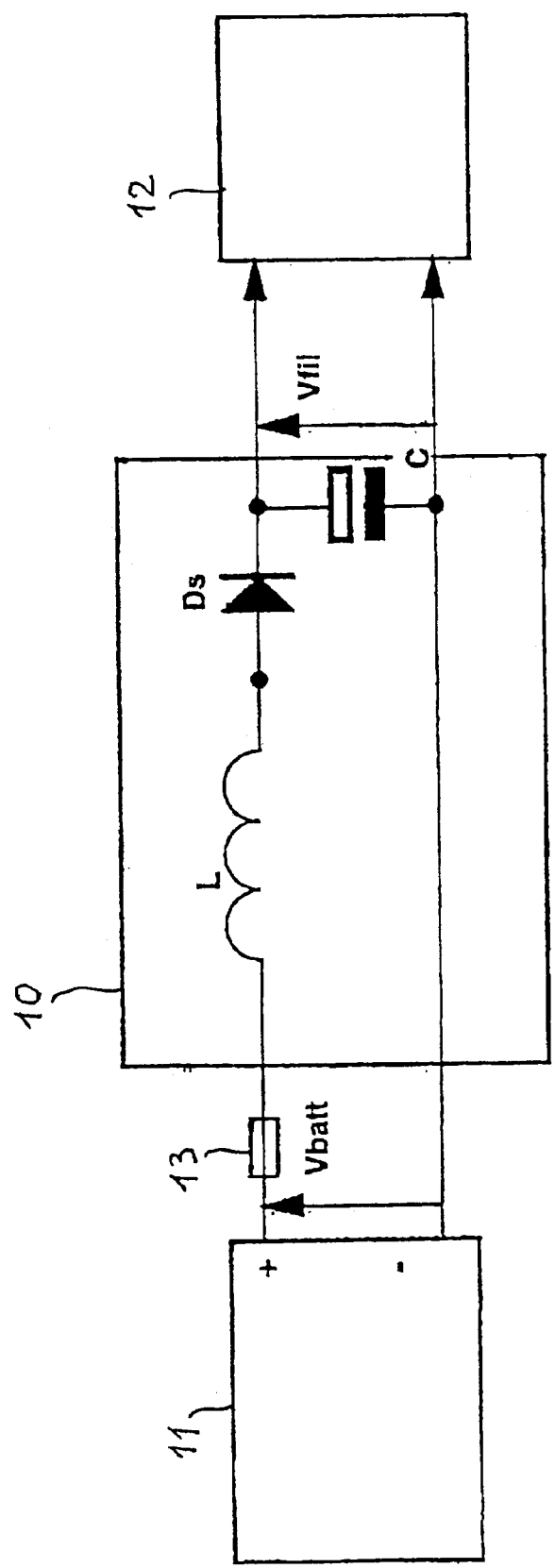
FIG. 2 shows a circuit for connection between a car radio and a battery, having filtering and protection functions according to a first embodiment of the invention.
Figure 3:
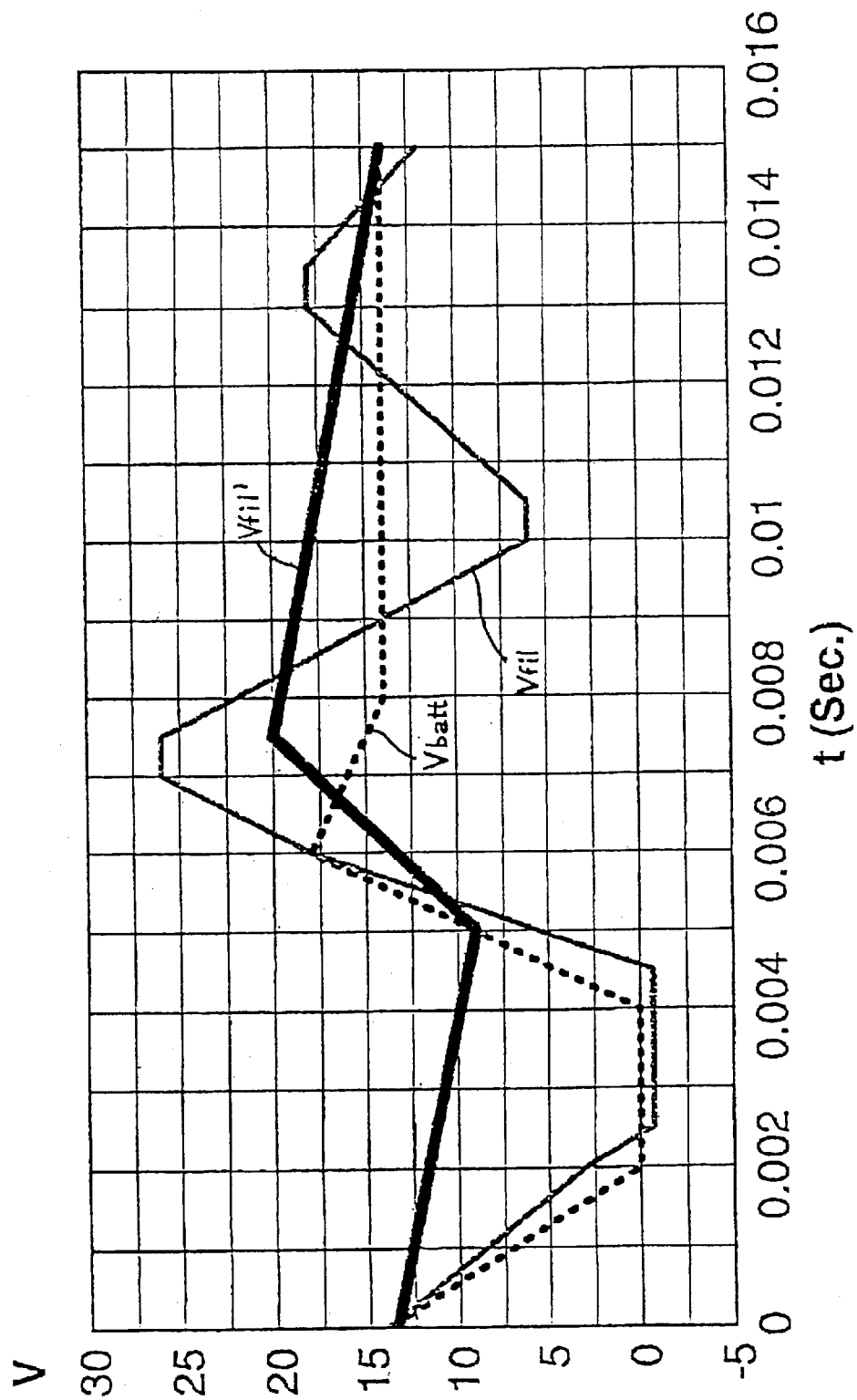
FIG. 3 is a graph illustrating the operation of the known circuit of FIG. 1 and that of the circuit according to the invention of FIG. 2.

As can be seen in FIG. 2, in which elements identical to those of FIG. 1 are indicated by the same reference numerals or symbols, the connection circuit according to the invention differs from the known circuit in that the protection against reversal of the battery polarity is provided by a diode, indicated Ds, connected in the forward conduction direction in series with one of the supply terminals of the car radio, instead of a diode in parallel as in the prior art. This different configuration leads to considerable advantages. In particular, if the battery is connected with reversed polarity, the diode Ds is reverse biased and thus blocks the supply to the car radio. A negative supply voltage can no longer be established between the supply terminals of the car radio. Moreover, any negative transient of the battery voltage Vbatt is attenuated by virtue of the series resistance of the diode Ds so that the voltage, indicated Vfil', filtered by the circuit, has an oscillation of smaller amplitude than that of the circuit of the prior art. For example, in the case shown by the graph of FIG. 3, the voltage Vfil' varies between 9 V and 20 V. Finally, the diode Ds may be of a smaller size and hence a lower cost than the diode Dp of the known circuit since its maximum reverse conduction current during operation with the polarity of the battery reversed is limited by the impedance of the load (the car radio).

Naturally, during normal operation, the effective supply voltage of the car radio, that is, the filtered voltage Vfil, is lower than the battery voltage. It is in fact Vbatt−Vds, where Vds is the voltage drop in the diode Ds connected for forward conduction (typically 0.4–0.6 V). This reduction may be negligible in many cases. However, if it is not negligible and it is in fact desired to have a supply voltage higher than the battery voltage, according to the invention, the connection circuit may be produced in a form that enables the voltage to be raised without the use of a special circuit downstream of the filtering and protection circuit.

Figure 4:
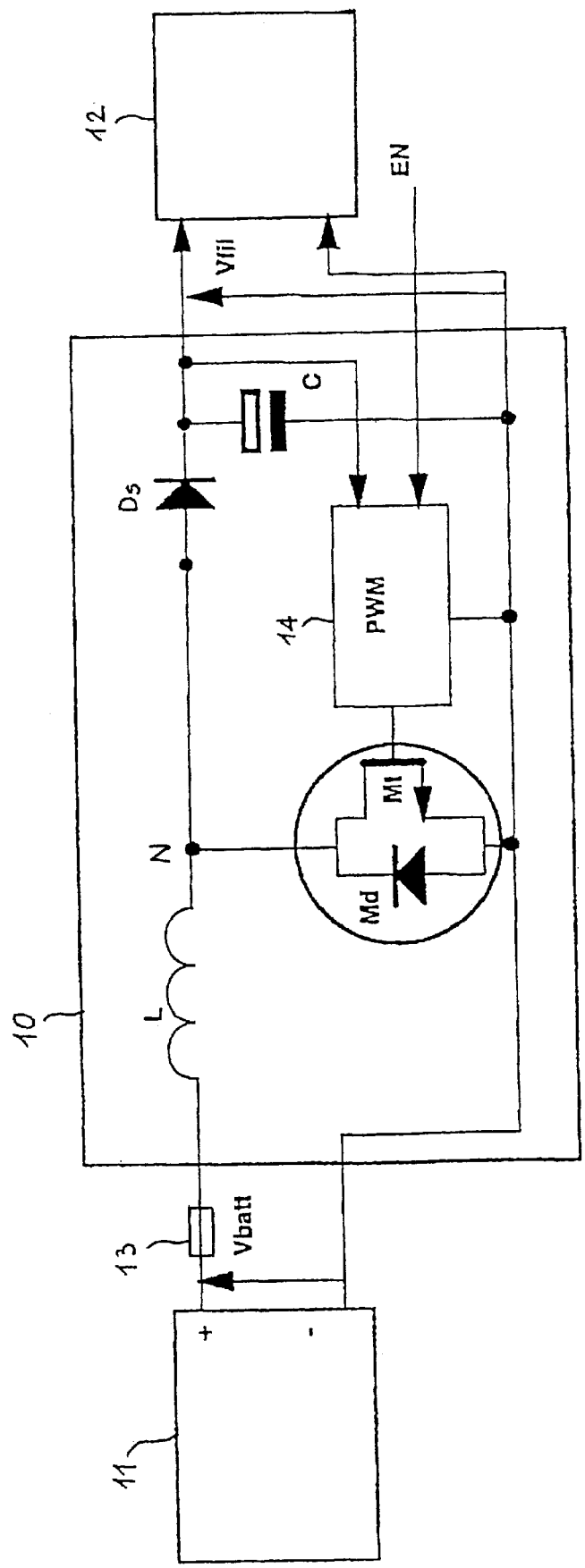
FIG. 4 shows a circuit for connection between a car radio and a battery, having filtering, protection and voltage-raising functions according to a second embodiment of the invention.

An embodiment of this type is shown in FIG. 4, in which elements identical to those of FIG. 2 are indicated by the same reference numerals or symbols.

The connection circuit of FIG. 4 comprises, in addition to the filtering components L and C and the protection diode Ds, an electronic switch Mt connected between the node N of the connection of the inductor L to the diode Ds and the negative supply terminal of the car radio, and a circuit 14 for controlling the switching of the electronic switch. In this embodiment, the electronic switch Mt is an n-channel MOS field-effect transistor (a MOSFET) having an intrinsic diode Md between its source and drain terminals. The gate terminal of the transistor Mt is connected to the output of the control circuit 14. It is to be understood that, instead of the MOSFET, there could be a bipolar transistor or another device with controllable conduction.

The control circuit 14 is connected to the supply terminals of the car radio both in order to be supplied with the continuous voltage Vfil that is established between them, and in order to generate switching signals in dependence on the voltage Vfil. The control circuit 14 is preferably a pulse-width modulator (PWM) the construction of which is known to those skilled in the art and which can apply a pulsed voltage of predetermined frequency to the gate terminal of the transistor Mt. The width of the pulses varies in dependence on the voltage Vfil and on the load constituted by the car radio 12.

The control circuit 14 also has an enabling terminal EN connected to a device or to an external circuit, not shown, for applying to this terminal a two-level signal for activating or deactivating the control circuit.

The operation of the circuit will now be considered. With the battery 11 connected correctly and the signal EN is such as to keep the control circuit 14 inactive, the transistor Mt is cut off (the diode Md is reverse biased) so that the voltage Vfil applied between the supply terminals of the car radio 12 is equal to the battery voltage Vbatt reduced by the voltage drop in the diode Ds. When the signal EN is such as to keep the control circuit 14 active, the transistor Mt is made conductive and non-conductive alternately. During the conduction period, a voltage substantially equal to the voltage Vbatt is applied to the terminals of the inductor L. When the transistor becomes non-conductive, the electromotive force induced in the inductor L causes the potential of the node N to rise until the diode Ds is made conductive. A current thus flows from the inductor L to the capacitor C and to the load 12. Suitable selection of the values of the inductor L and of the capacitor C, as well as of the frequency of the switching signal generated by the control circuit, achieves an output voltage Vfil of the connection circuit, that is, a supply voltage of the car radio, higher than the input voltage Vbatt. By way of example, with a voltage Vbatt=14 V, the inductor L may have an inductance of 220 $\mu$H, the capacitor C may have a capacitance of 2000 $\mu$F and the switching frequency of the control circuit 14 may be 50 kHz.

According to this embodiment of the invention, the components necessary for the filtering functions (L and C) and for the protection function (Ds) are also utilized to perform the voltage-raising function for which, otherwise, according to the prior art, a separate circuit would be required. It should also be noted that, in the event of accidental reversal of the battery polarity, the diode Md in parallel with the transistor Mt is connected for forward conduction and thus protects the transistor. It will be noted that, in this case, the negative voltage drop which is present at the terminals of the diode Md until the fuse 13 intervenes is not applied to the supply terminals of the car radio 12 because it is blocked by the diode Ds which is reverse biased in this situation.

Although only two embodiments of the invention have been described and illustrated, clearly many variations and modifications are possible within the scope of the same inventive concept as defined in the following claims and the equivalents thereof.

What is claimed is:

1. A circuit for connection between the supply terminals of a car radio and the poles of a motor-vehicle battery, comprising:

an inductor in series with one of the supply terminals, a capacitor in parallel with the supply terminals, a diode for protection against reversal of the battery polarity, the diode connected in series with the inductor to supply a filtered voltage to the supply terminals, an electronic switch connected between the node of the connection of the inductor to the diode and the other supply terminal, and a circuit for controlling the switching of the electronic switch, the control circuit having a input terminals connected to the supply terminals to receive the filtered voltage and comprising a regulator for providing switching signals to the electronic switch in dependence on the voltage present between the supply terminals.

2. The circuit of claim 1, wherein the diode is downstream of the inductor and upstream of the capacitor.

3. The circuit of claim 2, wherein the control circuit has an enabling terminal for activating or deactivating the control circuit in response to a control signal applied to the terminal.

4. The circuit of claim 1, wherein the regulator comprises a pulse-width modulator.

5. The circuit of claim 1, wherein the electronic switch comprises a field-effect transistor.

6. An accessory circuit for motor vehicles, comprising:
   a source of direct-current electrical energy;
   an electronic accessory; and
   a connecting circuit coupled to the electrical energy source and the electronic accessory for supplying a filtered voltage to the electronic accessory and for preventing current reversal, the connecting circuit comprising an inductor coupled in series with a first supply terminal of the electronic accessory, a capacitor coupled to the first and a second supply terminal of the electronic accessory, a diode connected in series with the inductor between the inductor and the first supply terminal of the electronic accessory and configured to prevent reversal of current flow between the electrical energy source and the electronic accessory, an electronic switch coupled between a node of the connection of the inductor to the diode and the second supply terminal of the electronic accessory, and a control circuit coupled to the switch for alternatively switching the electronic switch between a conducting state and a non-conducting state, the control circuit having a connection to the first supply terminal of the accessory for receiving the filtered voltage.

7. The accessory circuit of claim 6, further comprising a diode element coupled in parallel with the switch to prevent current reversal through the switch.

8. The circuit of claim 7, wherein the control circuit comprises a switching signal circuit that provides switching signals to the electronic switch to render the electronic switch alternating conductive and non-conductive at a predetermined frequency to increase the voltage supplied to the electronic accessory.

9. The accessory circuit of claim 8, wherein the switching signal circuit comprises a pulse width modulator.

10. A method for supplying a filtered voltage to an electronic accessory having supply terminals, where an inductor and diode are coupled in series between the battery and a first supply terminal of the electronic accessory, and a capacitor is coupled between the first supply terminal and a second supply terminal of the electronic accessory, the method comprising:
    alternatingly connecting the second supply terminal of the electronic accessory to a node of the connection of the inductor to the diode, and disconnecting the connection between the second supply terminal of the electronic accessory and the node to increase the voltage supplied by the battery to the electronic accessory by controlling a switch that is coupled to a control circuit having input terminals connected to the supply terminals to receive the filtered voltage.

11. The method of claim 10, wherein alternatingly connecting and disconnecting the second supply terminal is performed at a predetermined frequency.

12. The method of claim 11, wherein the predetermined frequency comprises 50 kHz when the inductor has an inductance of 220 $\mu$H, the capacitor has a capacitance of 2,000 microfarads, and the battery has a voltage of 14 voltz.

13. The method of claim 11, wherein alternatingly connecting and disconnecting the second supply terminal to the node comprises controlling the switch that is coupled between the second terminal and the node to alternatingly switch between a conducting state and a nonconducting state.

14. The method of claim 13, wherein controlling the switch comprises generating a control signal with a pulse width modulator that is responsive to the voltage at the first and second supply terminals and to an enabling signal.

15. The method of claim 14, comprising generating an enabling signal to the pulse width modulator to cause generation of the control signal to the switch for selectively raising the voltage supplied to the electronic accessory.

\* \* \* \* \*

UNITED STATES PATENT AND TRADEMARK OFFICE
CERTIFICATE OF CORRECTION

PATENT NO.    : 6,316,907 B1
DATED         : November 13, 2001
INVENTOR(S)   : Edoardo Botti et al.

It is certified that error appears in the above-identified patent and that said Letters Patent is hereby corrected as shown below:

Column 6,
Lines 22 and 23, "wherein altematingly connecting" should read as -- wherein alternatingly connecting --.
Lines 29 and 30, "wherein altematingly connecting" should read as -- wherein alternatingly connecting --.
Lines 32 and 33, "to altematingly switch" should read as -- to alternatingly switch --.

Signed and Sealed this

Twenty-first Day of May, 2002

Attest:

Attesting Officer

JAMES E. ROGAN
Director of the United States Patent and Trademark Office